(12) United States Patent
Hwang et al.

(10) Patent No.: US 9,269,964 B2
(45) Date of Patent: Feb. 23, 2016

(54) COMPOSITE CATALYST FOR ELECTRODE AND ELECTROCHEMICAL CELL USING THE SAME

(75) Inventors: Bing-Joe Hwang, Taipei (TW); Jing-Shan Do, Taipei (TW); Chi-Wen Lin, Taipei (TW); Jyh-Fu Lee, Taipei (TW); Shao-Kang Hu, Taipei (TW); Ching-Hsiang Chen, Taipei (TW); Shih-Chieh Yen, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 1315 days.

(21) Appl. No.: 12/315,684

(22) Filed: Dec. 5, 2008

(65) Prior Publication Data

US 2010/0143768 A1    Jun. 10, 2010

(51) Int. Cl.
*H01M 4/92* (2006.01)
*H01M 8/10* (2006.01)

(52) U.S. Cl.
CPC ............ *H01M 4/921* (2013.01); *H01M 8/1011* (2013.01); *Y02E 60/50* (2013.01); *Y02E 60/523* (2013.01)

(58) Field of Classification Search
None
See application file for complete search history.

(56) References Cited

U.S. PATENT DOCUMENTS

2008/0026282 A1 *  1/2008  Tamura et al. .................. 429/41

FOREIGN PATENT DOCUMENTS

CN            101268573         9/2008

OTHER PUBLICATIONS

"First Office Action of China Counterpart Application", issued on Mar. 25, 2011, p. 1-p. 4, in which the listed reference was cited.

* cited by examiner

*Primary Examiner* — Sarah A Slifka
(74) *Attorney, Agent, or Firm* — J.C. Patents

(57) ABSTRACT

A composite catalyst for an electrode is described, including platinum for dehydrogenation, an element E for water dissociation, and a material $MO_x$ for stabilization of the element E, wherein x ranges from 0 to 3.

16 Claims, 5 Drawing Sheets

US 9,269,964 B2

COMPOSITE CATALYST FOR ELECTRODE AND ELECTROCHEMICAL CELL USING THE SAME

BACKGROUND OF THE INVENTION

1. Field of Invention

This invention relates to the renewable energy technology, and more particularly to a composite catalyst for an electrode and to an electrochemical cell, such as a fuel cell or direct methanol fuel cell (DMFC), that includes an anode with the same thereon.

2. Description of Related Art

Among new energy technologies, fuel cell is particularly promising. The most promising type of fuel cell ought to be the direct methanol fuel cell (DMFC), for methanol is cheap, safe, easy to store and deliver as compared with hydrogen, and higher in the electrochemical activity as being an alcohol having the least carbon number. In a prior-art DMFC system, the anode catalyst material usually includes platinum (Pt). However, at low temperature, methanol is incompletely oxidized to produce CO on pure platinum electrode, where strong chemisorption of CO takes place on the active sites and poisons the catalyst. As a result, methanol oxidation as well as the electrochemical performance of the anode is significantly lowered.

For pure Pt anode for DMFC, the catalyst is easily poisoned due to incomplete oxidation of methanol, so that the development of pure Pt catalysts is limited. Hence, many researchers turned to study bimetallic catalysts like PtRu. However, PtRu catalysts suffer from problems like Ru dissolution during the electrochemical reaction.

SUMMARY OF THE INVENTION

Accordingly, this invention provides a composite catalyst for an electrode, where the dissolution of the element for water dissociation reaction in the composite catalyst is inhibited in an electrochemical reaction.

This invention also provides an electrochemical cell using the composite catalyst of this invention.

The composite catalyst of this invention includes platinum for dehydrogenation, an element E for water dissociation, and a material for stabilization of the element E.

The element E for water dissociation can dissociate water molecules to form hydroxyl groups, which aid the oxidation of the chemisorbed carbon monoxide and therefore recover the active sites of platinum. The element E may be selected from the group consisting of Ru, Rh, Pd, Ir, Ni, Co, Fe, Mo, Cr, Cu and Sn.

The stabilization material can form strong interactions with the element E (e.g., Ru) for water dissociation in the composite catalyst, thus inhibiting the dissolution of the latter in the composite catalyst. The material may be pure element or oxide and is defined as $MO_x$, wherein x ranges from 0 to 3. The element M is selected from the group consisting of Al, Ti, Ta, Ce, Y, Zr, Nb, Gd, Sm, La and Si, which is able to form strong interactions with Ru.

This invention further provides an electrochemical cell, such as a fuel cell or a direct methanol fuel cell (DMFC), that includes an anode with an above composite catalyst of this invention thereon.

By adding the above-defined $MO_x$ into the composite catalyst, the dissolution of Ru in an electrochemical reaction is effectively reduced so that the anti-poison capability of the catalyst is maintained, and the catalytic ability of the same is enhanced in some cases.

Besides the stabilization effect, the material $MO_x$ to some extent is able to form hydroxyl groups on their surface, which is helpful to complete oxidation of carbon monoxide.

In order to make the aforementioned and other objects, features and advantages of the present invention comprehensible, a preferred embodiment accompanied with figures is described in detail below.

DESCRIPTION OF EMBODIMENTS

Figure 1:
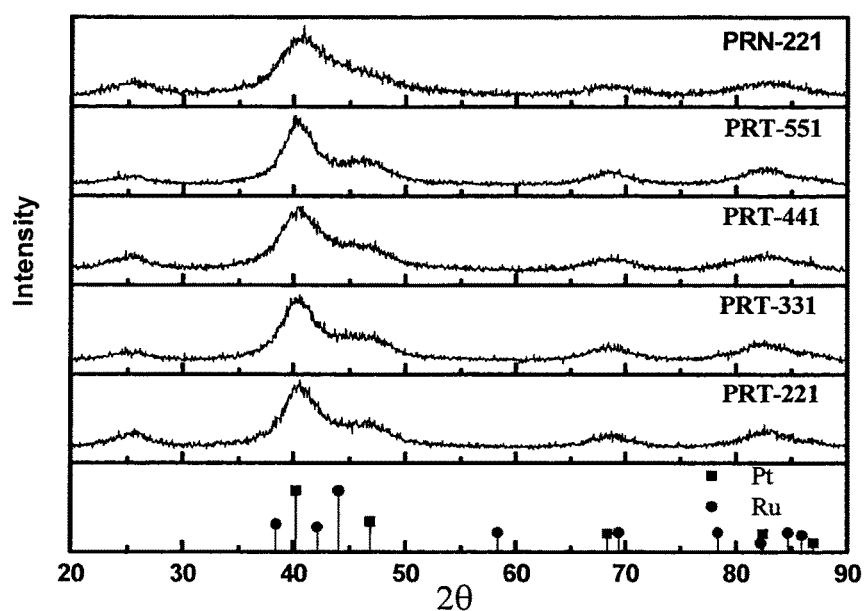
FIG. 1 shows the respective X-ray powder diffraction spectra of some exemplary composite catalysts according to an embodiment of this invention.

In the composite catalyst of this invention, the element E may be pure element with surfaced hydroxyl groups from water dissociation reaction, and may be selected from the group consisting of Ru, Rh, Pd, Ir, Ni, Co, Fe, Mo, Cr, Cu and Sn. $MO_x$ may be a pure element or oxide. When x is equal to zero, $MO_x$ may be a pure element selected from the group consisting of Al, Ti, Ta, Ce, Y, Zr, Nb, Gd, Sm, La and Si. When x is larger than zero, $MO_x$ may be stoichiometric oxide(s) or non-stoichiometric oxide(s) wherein the element M is selected from the above group.

In addition, it is preferred that the molar ratio of Pt and the element E to the element M ranges from 1:0.0001 to 1:10 and the molar ratio of Pt to the element E ranges from 10:1 to 1:10. The composite catalyst usually has an average grain size within the range of 0.5-1000 nm.

Among the additives including the elements in the above group and their oxides, Ti, $TiO_2$, Nb and $Nb_2O_5$ are more preferred. When the additive is zero-valence-state Ti, M=Ti and x=0. When the additive is $TiO_2$, M=Ti and x=2. When the additive is a mixture of Ti and $TiO_2$, M=Ti and 0<x<2. When the additive is zero-valence-state Nb, M=Nb and x=0. When the additive is $Nb_2O_5$, M=Nb and x=2.5. When the additive is a mixture of Nb and $Nb_2O_5$, M=Nb and 0<x<2.5. For example, in a preferred embodiment described below (PRT221), M=Ti and x=0.

In an embodiment of preparing a composite catalyst for an electrode of this invention, a reduction reaction is finally conducted possibly with $H_2$-gas. The process of preparing the solid mixture may include the following steps. A $H_2PtCl_6$ solution and a $RuCl_3$ solution are provided, and $NaHSO_3$ is added into the $H_2PtCl_6$ solution and the $RuCl_3$ solution, respectively. A chloride of the element M is dissolved in a solvent to form a solution thereof. The $H_2PtCl_6$ solution, the $RuCl_3$ solution and the solution of the chloride of the element M are mixed to form a mixed solution, and an aqueous solution of $H_2O_2$ is added into the mixed solution while a NaOH solution is dropped into the mixed solution to keep a pH value thereof at about 5. The mixed solution is heated and refluxed to obtain precipitate, and then the precipitate are washed and dried. The precipitate is then reduced with a reductant.

In the above process, the mixed solution may be refluxed at a temperature of 30-120° C. for about 8 hours. The reduction reaction may use a $H_2$/Ar mixed gas as the reductant and be conducted at a temperature of 100-400° C. for 2-6 hours.

<Preparation of Composite Catalysts of PRT (PtRuTi) Type>

Four PRT-type composite catalysts, PRT221 (Pt:Ru:Ti=2:2:1 in the molar ratio), PRT331 (Pt:Ru:Ti=3:3:1), PRT441 (Pt:Ru:Ti=4:4:1) and PRT551 (Pt:Ru:Ti=5:5:1), were respectively prepared as follows. A 7.5 ml of aqueous solution of $1.4646 \times 10^{-4}$ mole of $H_2PtCl_6$ and 7.5 ml of aqueous solution of $1.4646 \times 10^{-4}$ mole of $RuCl_3$ were prepared respectively. Each of the two solutions was then added with 0.3033 g of $NaHSO_3$ for formation of Pt complex. An amount of $TiCl_4$ corresponding to the molar ratio "Pt:Ru:Ti" was dissolved in 10 ml of pure water, and then the resulting $TiCl_4$ solution, the $H_2PtCl_6$ solution and $RuCl_3$ solution were fully mixed with further addition of moderate amount of carbon black, and the mixed solution was subjected to supersonic vibration for 30 minutes. Then, 11 ml of pure $H_2O_2$ solution was added into the mixed solution while 1 M NaOH solution was slowly dropped in the mixed solution to keep its pH value at about 5. The mixed solution was refluxed at 100° C. for 8 hours to form a precipitate, which is washed, dried and collected. The collected precipitate was then reduced with 10% $H_2$/Ar gas at 300° C. for 2 hours.

Figure 2:
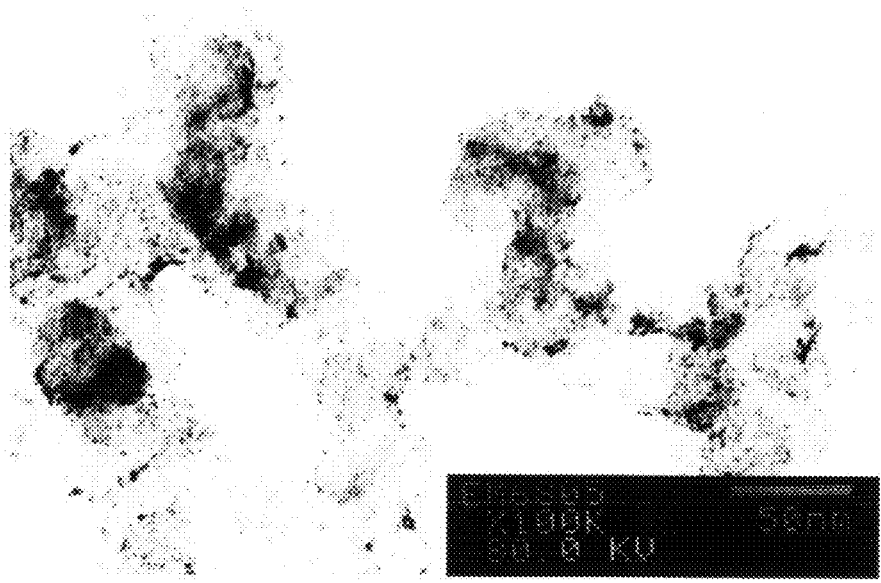
FIG. 2 is a TEM image of PRT221 (Pt:Ru:Ti=2:2:1) as an exemplary composite catalyst of this invention.

The respective X-ray powder diffraction patterns of PRT221, PRT331, PRT441 and PRT551 are shown in FIG. 1, and a TEM image of PRT221 is shown in FIG. 2.

<Preparation of Composite Catalysts of PRN (PtRuNb) Type>

One PRN-type composite catalyst, PRN221 (Pt:Ru:Nb=2:2:1), was prepared as follows. A 7.5 ml aqueous solution of $1.4646 \times 10^{-4}$ mole of $H_2PtCl_6$ and 7.5 ml aqueous solution of $1.4646 \times 10^{-4}$ mole of $RuCl_3$ were prepared respectively. Each of the two solutions was then added with 0.3033 g of $NaHSO_3$ for formation of Pt complex. An amount of $NbCl_5$ corresponding to the molar ratio "Pt:Ru:Nb" was dissolved in 10 ml of pure water, and then the resulting $NbCl_5$ solution, the $H_2PtCl_6$ solution and $RuCl_3$ solution were fully mixed with addition of a moderate amount of carbon black, and the mixed solution was subjected to supersonic vibration for 30 minutes. Then, 11 ml of pure $H_2O_2$ solution was added into the mixed solution while 1 M NaOH solution was slowly dropped in the mixed solution to keep its pH value at about 5. The mixed solution was refluxed at 100° C. for 8 hours to form a precipitate, which is washed, dried and collected. The collected precipitate was then reduced with 10% $H_2$/Ar gas at 300° C. for 2 hours.

Figure 3:
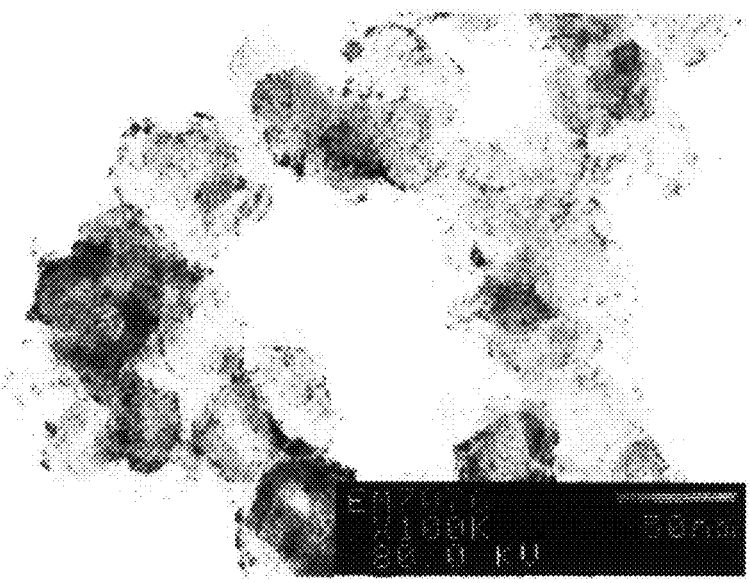
FIG. 3 is a TEM image of PRN221 (Pt:Ru:Nb=2:2:1) as another exemplary composite catalyst of this invention.

The X-ray powder diffraction pattern of PRN221 is also shown in FIG. 1, and a TEM image of the same is shown in FIG. 3.

<Polarization Curve Test>

The electrochemical catalytic ability of an electrode catalyst can be evaluated from the relationship between the electrode potential and the methanol oxidation current density, which is shown as a methanol-oxidation polarization curve of the catalyst. By measuring the polarization curves of different catalysts, the differences between their catalytic performances in methanol oxidation can be realized.

Figure 4:
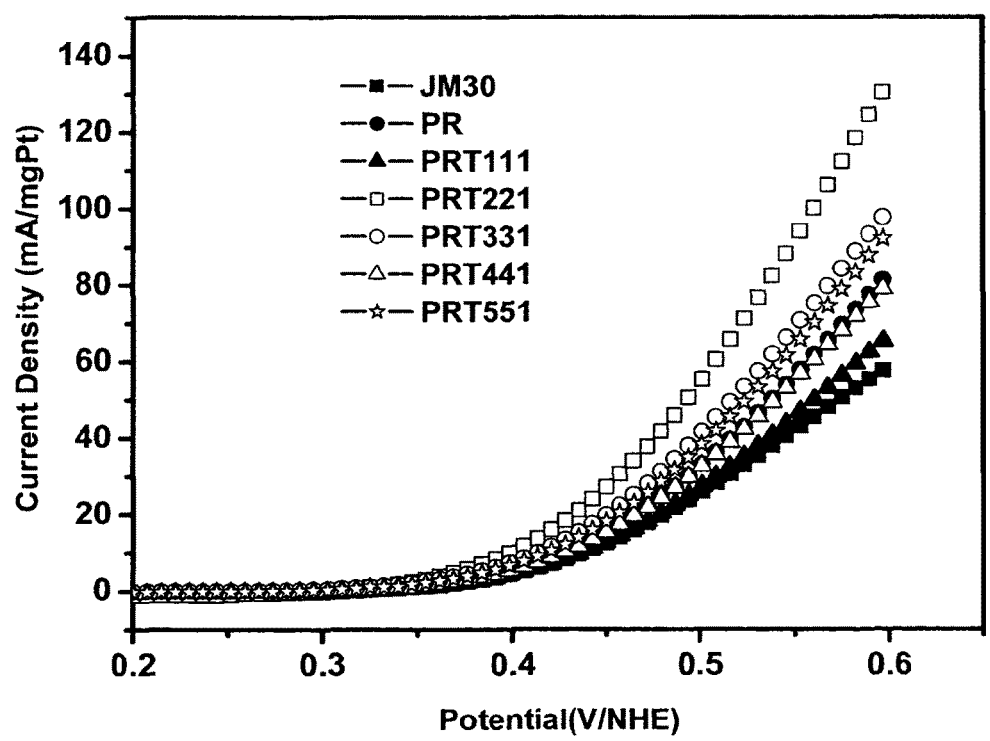
FIG. 4 shows the methanol-oxidation polarization curves of some exemplary composite catalysts of this invention and a commercial PtRu catalyst "JM30" respectively in a 10% methanol solution.

FIG. 4 shows the methanol-oxidation polarization curves of some exemplary composite catalysts of this invention and a commercial PtRu catalyst "JM30" (from Johnson Matthey Company) respectively in a 10 vol % methanol solution. The specific current density in this experiment is defined as the current per milligram of platinum, and the potential is corresponding to a normal hydrogen electrode (NHE). Before the polarization curve is measured, a pre-treatment for the catalyst on the electrode is performed with a voltage of 0.05V for 30 minutes.

It is clear from FIG. 4 that the specific current density for the catalyst "PRT221" of this invention is remarkably higher than that for the conventional PtRu catalyst "JM30", and the specific current density for PRT331, PRT441 or PRT551 is about the same as that for JM30. Hence, PRT221 has a relatively higher performance in catalytic oxidation of methanol.

<Test for Stability of Catalyst>

To evaluate the dissolution behavior of ruthenium in the catalyst, each of the above catalysts JM30, PRT221-PRT551 and PRN221 was tested in a direct methanol full cell in a potentiostatic manner. In this experiment, each catalyst was incorporated into an electrode, and the electrode was used as an anode of a DMFC and held at 0.644V/NHE for 80 hours. After that, a XANES (X-ray Near-Edge Structure) spectrum and the Fourier transform (FT) of $k^2$-weighted EXAFS (Extended X-ray Absorption Fine Structure) spectrum at Ru K-edge were obtained by X-ray absorption analysis for the used catalyst. The edge jump value of the XANES spectrum of the used catalyst was compared with that of the unused catalyst to derive the change of the Ru content in the catalyst caused by the electrochemical reaction. The EXAFS spectrum of the used catalyst was also compared with that of the unused catalyst. The results are shown as follows.

Figure 5:
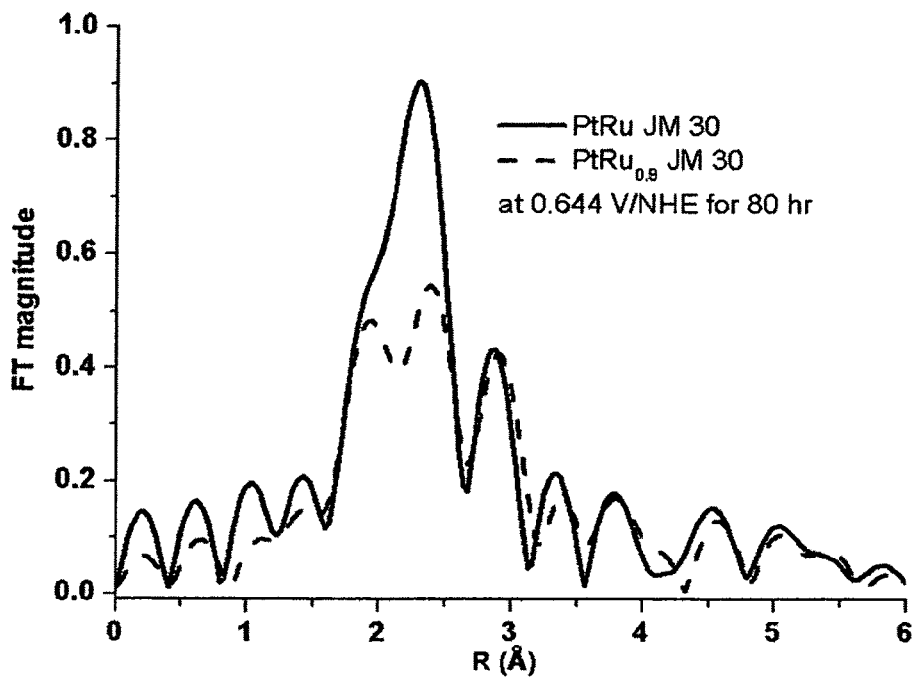
FIG. 5 shows the FT-$k^2$-weighted EXAFS spectra of Ru K-edge of JM30 respectively before and after 80 hours of potentiostatic dissolution test.
Figure 6:
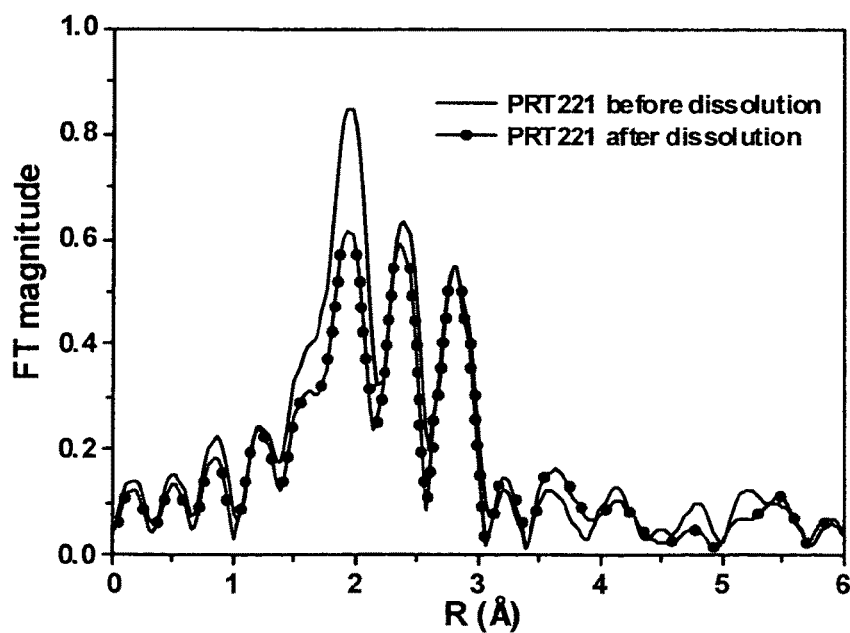
FIG. 6 shows the FT-$k^2$-weighted EXAFS spectra of Ru K-edge of PRT221 respectively before and after 80 hours of potentiostatic dissolution test.
Figure 7:
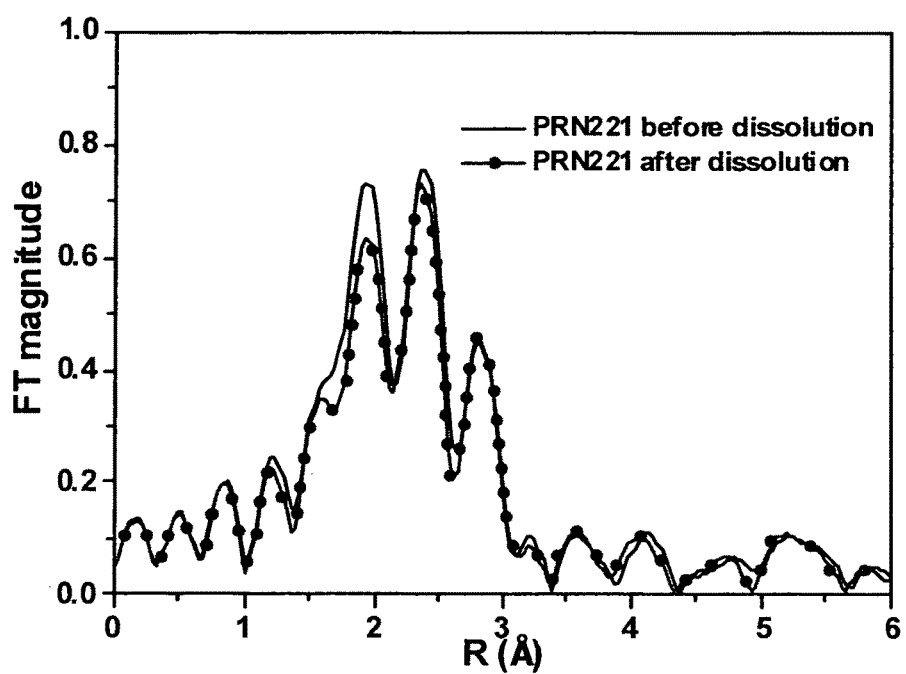
FIG. 7 shows the FT-$k^2$-weighted EXAFS spectra of Ru K-edge of PRN221 respectively before and after 80 hours of potentiostatic dissolution test.

FIG. 5 shows the FT of $k^2$-weighted EXAFS spectra at Ru K-edge for JM30 respectively before and after 80-hour potentiostatic operation. It is clear from FIG. 5 that the FT of the conventional catalyst JM30 had a remarkable change, indicating the changes of its structure and composition. FIG. 6/7 shows the FT of $k^2$-weighted EXAFS spectra at Ru K-edge for PRT221/PRN221 respectively before and after 80-hour potentiostatic dissolution test. It is clear from FIG. 6/7 that the FT had no substantial change, indicating no obvious changes of the structure and composition.

Moreover, the respective Ru-dissolution percentages of JM30, PRT221-PRT551 and PRN221 are listed in Table 1. As shown in Table 1, a PtRu-based electrode composed of Ti, $TiO_2$, Nb or $Nb_2O_5$ can effectively reduce the Ru dissolution in high potential, wherein PRT221 shows a relatively stronger inhibition of Ru dissolution. Accordingly, PRT221 behaves well in catalytic oxidation of methanol as well as in reducing Ru dissolution. It is also clear that the effect of Ti is better than that of Nb.

TABLE 1

|  | Ru/Pt before test | Ru/Pt after test | Ru-dissolution (%) = (Initial − Final)/ Initial × 100 |
|---|---|---|---|
| JM30 | 1.3353 | 1.1454 | 14.22 |
| PRT221 | 0.9317 | 0.9118 | 2.14 |
| PRT331 | 0.9892 | 0.9375 | 5.22 |
| PRT441 | 1.0171 | 0.9719 | 4.44 |
| PRT551 | 0.9267 | 0.8664 | 6.52 |
| PRN221 | 1.2314 | 1.1258 | 8.58 |

This invention has been disclosed above in the preferred embodiments, but is not limited to those. It is known to persons skilled in the art that some modifications and innovations may be made without departing from the spirit and scope of this invention. Hence, the scope of this invention should be defined by the following claims.

What is claimed is:

1. A composite catalyst, comprising platinum, an element E for water dissociation, and a material $MO_x$ ($x \geq 0$) that inhibits dissolution of the element E, wherein M indicates an element and O indicates oxygen, the element M is selected from the group consisting of Al, Ti, Ta, Ce, Y, Zr, Nb, Gd, Sm, La and Si, and the composite catalyst is prepared through steps comprising: precipitation of a plurality of compounds comprising a compound of platinum, a compound of the element E and a compound of the element M, and subsequent reduction with a reductant.

2. The composite catalyst of claim 1, wherein x ranges from 0 to 3.

3. The composite catalyst of claim 1, wherein M is Ti and x ranges from 0 to 2.

4. The composite catalyst of claim 1, wherein M is Nb and x ranges from 0-2.5.

5. The composite catalyst of claim 1, wherein a molar ratio of platinum and the element E to the element M ranges from 1:0.0001 to 1:10, and a molar ratio of platinum to the element E ranges from 10:1 to 1:10.

6. The composite catalyst of claim 1, wherein the material $MO_x$ has sufficiently strong interaction with the element E such that the element E is stabilized.

7. The composite catalyst of claim 1, wherein the element E is selected from the group consisting of Ru, Rh, Pd, Ir, Ni, Co, Fe, Mo, Cr, Cu and Sn.

8. The composite catalyst of claim 1, wherein the average grain size of the composite catalyst is within a range of 0.5-1000 nm.

9. An electrochemical cell that includes an anode with the composite catalyst of claim 1 thereon.

10. An electrochemical cell that includes an anode with the composite catalyst of claim 2 thereon.

11. An electrochemical cell that includes an anode with the composite catalyst of claim 3 thereon.

12. An electrochemical cell that includes an anode with the composite catalyst of claim 4 thereon.

13. An electrochemical cell that includes an anode with the composite catalyst of claim 5 thereon.

14. An electrochemical cell that includes an anode with the composite catalyst of claim 6 thereon.

15. An electrochemical cell that includes an anode with the composite catalyst of claim 7 thereon.

16. An electrochemical cell that includes an anode with the composite catalyst of claim 8 thereon.

* * * * *